Jan. 19, 1932.                  J. S. STULL                  1,841,422
                       APPARATUS FOR FORMING ARTICLES
                  Filed April 2, 1930       2 Sheets-Sheet 1
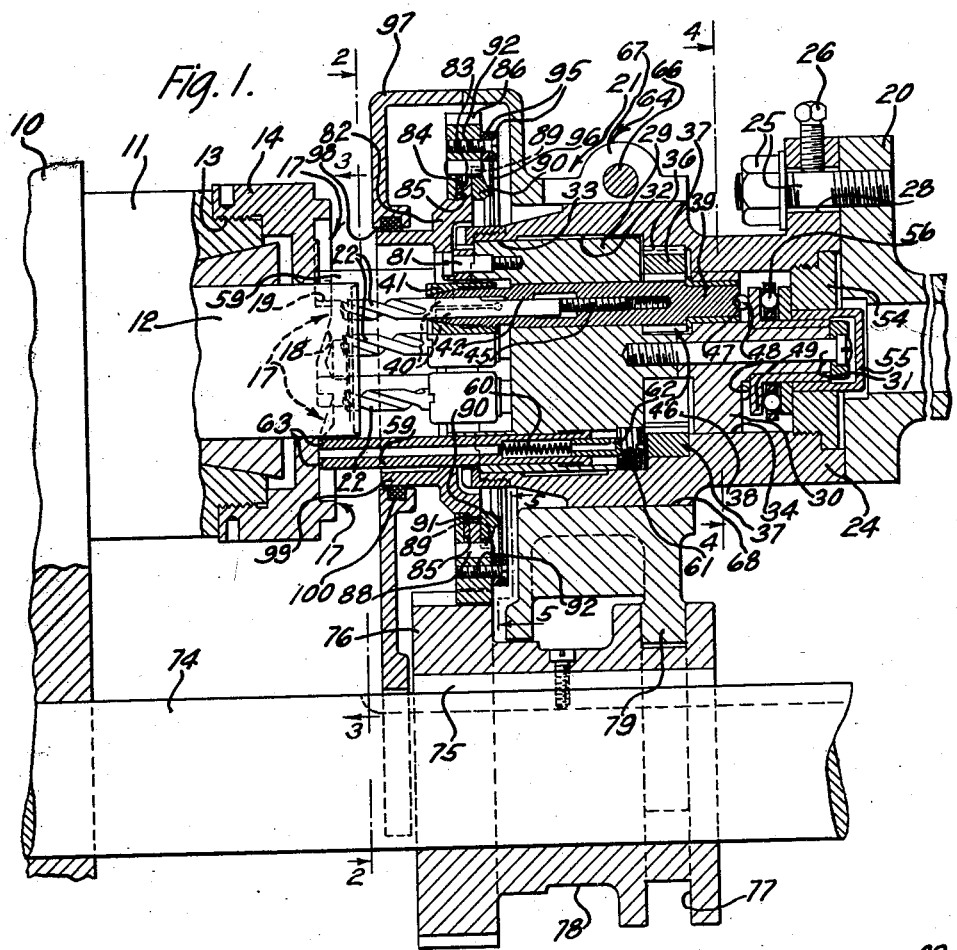
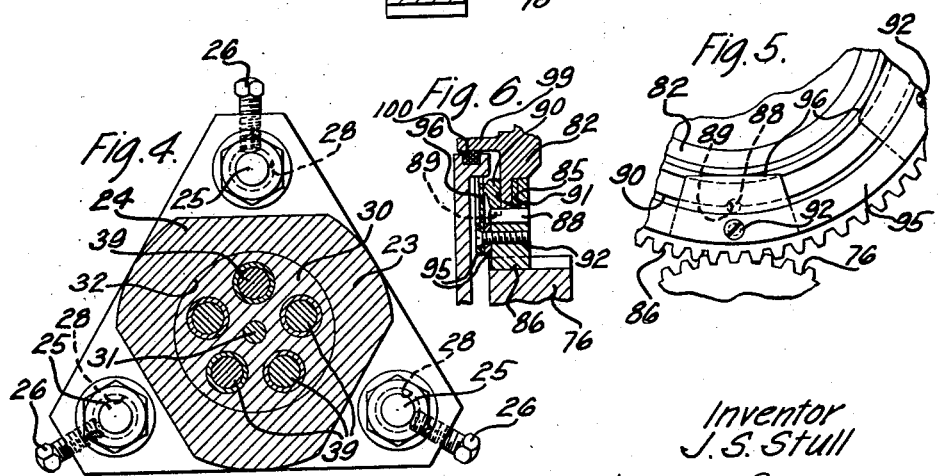
Inventor
J. S. Stull
By H. B. Whitfield Atty.

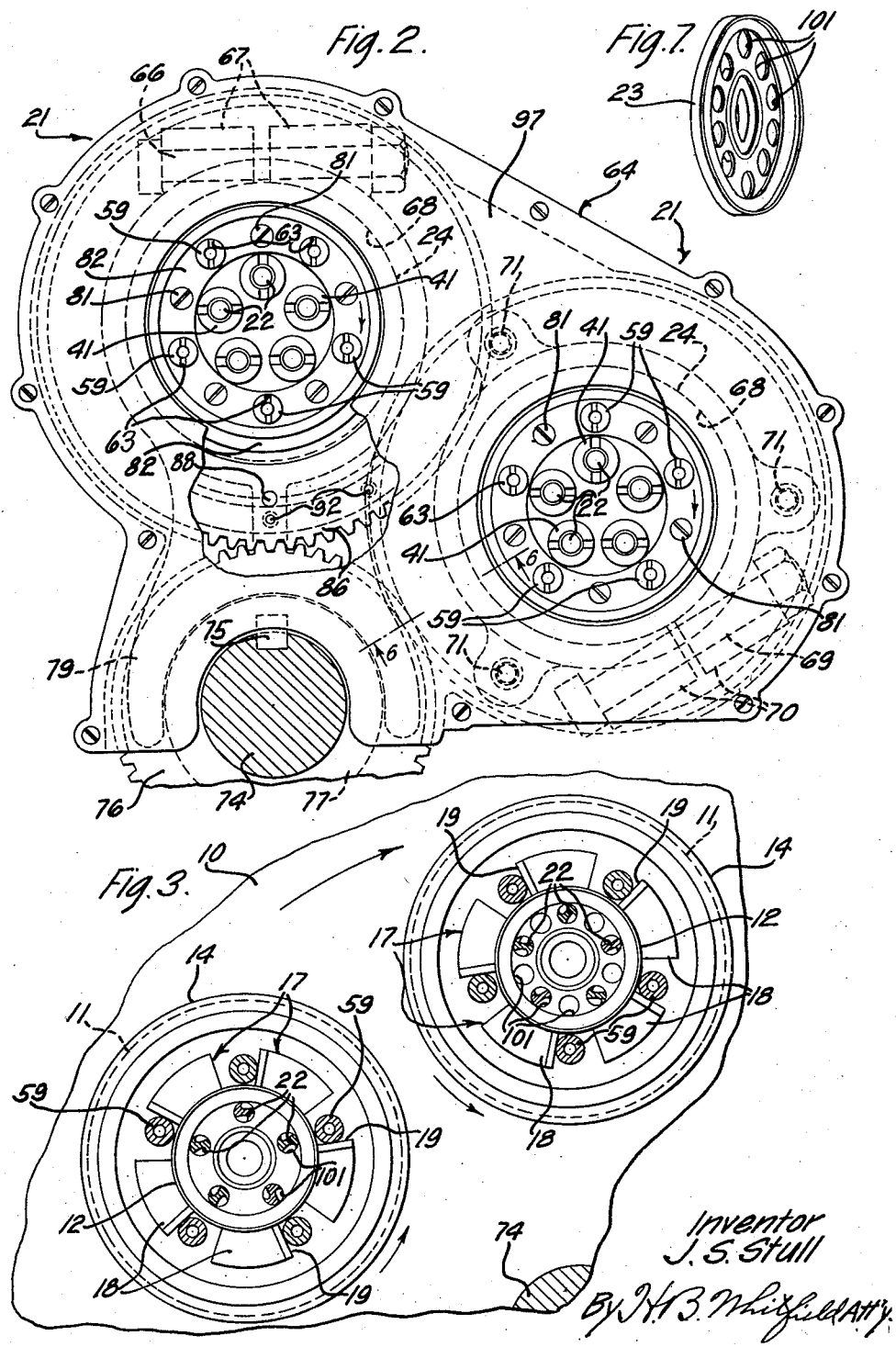

Patented Jan. 19, 1932

1,841,422

UNITED STATES PATENT OFFICE

JOHN S. STULL, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR FORMING ARTICLES

Application filed April 2, 1930. Serial No. 440,920.

This invention relates to apparatus for forming articles, and more particularly to the manufacture of piece parts on automatic screw machines wherein successive forming operations are performed on a blank or bar of stock to produce piece parts of predetermined shape and dimensions.

The primary object of this invention is to provide an apparatus designed to facilitate the forming of articles rapidly and accurately and requiring a minimum of attention on the part of an operator.

In accordance with one embodiment of this invention as applied to multiple spindle automatic screw machines, the usual rotary stock spindles mounted in a rotary or indexable turret are each provided on their forward ends with a series of notches or teeth. Adjacent the notched forward ends of the stock spindles is a group of drill heads which are movable longitudinally toward and away from the turret at predetermined intervals. The drill heads each carry a group of rotary drills for drilling two groups of holes in an end face of the article being formed from the stock, one group being formed in the stock while the stock is in one position, while the other group is drilled when the stock is indexed to the next succeeding position. When the drills of each group are idle they are rotated by an individual friction drive mechanism at a speed which is slightly less than that of the stock spindle. Each group of drills has a plurality of yieldingly mounted pins corresponding in number to the teeth on the end of each stock spindle, which when the drill heads move to a drilling position engage the teeth on the stock spindle and cause the positive rotation of the drills at the speed of the stock spindles. The differential between the speeds of the stock spindle and the group of drills is slight, and consequently the group of drills is quickly and without damage brought to the same speed as the stock spindle, slippage occurring in the friction drive mechanism for the drills.

Other objects and advantages of this invention will more fully appear from the following detailed description taken in connection with the accompanying drawings, wherein Fig. 1 is a fragmentary longitudinal view, partly in section, of a multiple spindle automatic screw machine embodying the features of this invention;

Fig. 2 is a vertical section taken on the line 2—2 of Fig. 1;

Fig. 3 is a vertical section taken on the line 3—3 of Fig. 1;

Fig. 4 is a vertical section taken on the line 4—4 of Fig. 1;

Fig. 5 is a fragmentary vertical section taken on the line 5—5 of Fig. 1;

Fig. 6 is a detail section taken on the line 6—6 of Fig. 2, and

Fig. 7 is a perspective view of an article produced by the apparatus of this invention.

The apparatus embodying features of this invention and illustrated in Figs. 1 to 6, inclusive, is designed to be applied to an automatic screw machine of the type wherein a plurality of rotary tools are positioned at spaced stations, and a plurality of bars of stock are held in spindles which are rotatably mounted in a turret which is intermittently rotated to index the bars successively into juxtaposition with each of the stations. The tools are carried on a common slide designed to be advanced periodically to bring the tools into operative positions relative to the bars of stock, and the bars are rotated about their respective axes by the spindles to cause the various tools to perform work on the ends of the bars.

Referring now to the drawings in detail, wherein similar reference numerals indicate like parts throughout the several views, and particularly to Figs. 1 and 3, a rotatable turret 10 carries a plurality of stock spindles (not shown) which terminate in stock holding chucks 11, only one of which is shown fragmentarily in Fig. 1, and the forward ends of two in Fig. 3, since all are identical in construction. The spindles and chucks 11 are positioned at spaced points around the periphery of the rotatable turret 10 and are designed to receive the several bars of stock 12. Suitable known driving means (not shown) is provided for rotating the spindles carrying the chucks 11 about their respective axes, the bars 12 being periodically advanced longitudinally of the chucks 11 by suitable advancing means, which form a part of the known automatic machines and are not shown in the drawings. Threadedly secured, as indicated at 13 (Fig. 1) to the forward end of each chuck 11 is a ring 14 closely surrounding the periphery of the bar 12 and provided upon its outer end face with a plurality of, in the present instance five, equally spaced serrations, notches or teeth 17 provided with comparatively long inclined faces 18 extending around the ring and short flat faces 19 extending in their shorter dimension parallel to its axis of rotation with the chuck 11. The purpose of the teeth 17 will be made apparent hereinafter.

Mounted upon a slide of known construction (not shown) by means of brackets 20, one of which is shown fragmentarily in Fig. 1, are two drill heads 21. The drill heads 21 are disposed adjacent the forward ends of the spindles carrying the chucks 11 in turn supporting the toothed rings 14. Suitable actuating means of known construction serve to advance periodically the slide carrying the drill heads 21 in timed relation with the indexing of the turret 10 to bring rotary drills 22 carried by the heads 21 into operative positions relative to the bars 12, which at this time are rotating, as well as the drills, as will be explained hereinafter. The driving and actuating mechanism for rotating the spindles (not shown) carrying the chucks 11, closing and releasing the chucks, advancing the bars 12 to the chucks, rotatably indexing the turret 10 and advancing the drill heads 21, which are operated in proper sequence, is not shown in the drawings, since this mechanism forms no part of the present invention and a disclosure thereof is not believed necessary to a full understanding thereof.

The particular apparatus illustrated in the drawings is designed to drill two groups of displaced apertures in a circular face of a telephone transmitter electrode 23 (Fig. 7) after it has been partially formed from the bar 12 but not severed therefrom. A plurality of other tools which act in proper sequence with the drills 22 and the intermittently indexed bar 12 to perform work thereon to complete the electrode 23 are not shown in the drawings, since they are not necessary to a complete understanding of this invention.

Each of the drill heads 21 includes a frame 24 which is adjustably mounted upon its bracket 20 by means of a plurality of clamping nuts and set screws 25 and 26, respectively, (Figs. 1 and 4). The clamping screws 25 extend through enlarged apertures 28 formed in a flange on the frame 24 and are threaded into the bracket 20 and after the axial alignment of the several groups of drills 22 carried in the heads 21 with the bars 12 carried in the chucks 11, the nuts of the screws 25 are tightened and thereafter the set screws 26 are tightened to insure the retention of the alignment. Rotatably mounted in the frame 24 is a drill carrier 29 (Fig. 1) having an extension member 30 at its right end secured to rotate therewith by means of a screw and washer 31, the carrier 29 and the member 30 being journaled upon the frame 24 in a shouldered aperture 32 formed therein, at points 33 and 34, respectively. Keyed as indicated at 36 within the aperture 32 of the frame 24 is an internal ring gear 37, the ring gear being positioned in an annular chamber 38 formed between the carrier 29 and the extension member 30 therefor.

The drills 22, five in number in the present embodiment of this invention, and mounted in each head 21 and journaled in each of the carriers 29, as shown in Fig. 2, are similarly arranged about the axis of the carrier. Referring to Fig. 1 wherein one of the drills 22 is shown longitudinally, each of the drills is held in a chuck spindle 39 provided at its forward end with gripping jaws 40 actuated to grip or release the drill by turning a collar 41 threaded onto the forward end of the chuck which is split to form the jaws. The chuck 39 is provided with an internal flat surface 42 with which an outer flat surface upon the drill is aligned, thus positively preventing relative movement between the chuck spindle 39 and the drill when the drill is properly mounted in the chuck spindle. The inner end of the drill 22 is engaged with the outer end of a screw 45 threaded axially into the chuck spindle 39. Formed on that portion of the periphery of each of the chuck spindles 39 which lie within the chamber 38 is a gear pinion 46, each of the pinions meshing with the internal ring gear 37 mounted in the frame 24. Formed axially in the inner end surface of each of the chucks 39 is a ball seat 47 engaged by a ball 48. The balls 48 ride at points opposite the seats 47 upon an annular plate 49 clamped at its inner end against a shoulder provided upon a reduced end of the extension member 30 of the carrier 29 by the screw and washer 31, the screw extending through the reduced end of the extension member and threaded axially into a reduced end of the drill carrier 29. Threaded into the outer end of the shouldered aperture 32 of the frame 24 is a plug 54 provided with a cover portion 55 for the screw and washer 31. Fitting between the opposed surfaces of the plate 49 and the plug 54 is a roller bearing 56 for taking the thrust of the drill carrier 29 during the drilling operation.

Each of the drill carriers 29 carries a group of yieldably mounted pins 59, five in number, corresponding to the number of teeth 17 formed in the end of the ring 14 carried by the forward end of the bar chuck 11 and also the number of drills 22 within each group thereof. Each group of pins 59 is similarly arranged about the axis of its carrier 29 and outside the drills 22 also carried thereby, except as will be noted, referring to Fig. 2, the pins in the lower carrier are in radial alignment with the associated drills, while in the upper carrier the pins are displaced with respect to the drills such that each pin lies midway between two drills. With this arrangement it will be apparent that the bars 12 after being drilled by the lower group of drills 22 and thereafter indexed to the upper group of drills the latter will drill the bars at points half way between the previously drilled apertures. The group of pins 59, as will be observed in Fig. 3, are disposed radially with respect to the axis of the bar 12 to be drilled and outside of the periphery thereof so that they will engage the flat faces 19 of the teeth 17 substantially midway of their length.

The pins 59 are each provided longitudinally with an axial aperture within which is mounted a compression spring 60 engaging at one end an annular shoulder providing a reduced diameter to the aperture, and at its opposite end the inner reduced end of a plug 61 having a sliding fit in the aperture of the pin 59, the outer end of the plug being threaded into the carrier 29. It will be apparent that the spring 60 normally will hold the pin 59 in its outermost position, its movement being limited by cooperating shoulders formed upon the carrier 29 and the pin 59, and when the pin moves inwardly in the operation of the apparatus, it slides upon the reduced inner end of the plug 61. During this latter movement of the pin 59 the air in the aperture in the carrier 29 between the pin 59 and the plug 61 escapes through an aperture 62 formed in the plug 61 and into the axial aperture of the pin to atmosphere through slots 63 formed in the outer end of the pin.

The frames 24 for the drill carriers 29 are surrounded by a common housing 64 which is clamped to the upper frame 24 by a bolt 66 and an integral split strap portion 67 of the housing (Figs. 1 and 2), individual openings 68 (Fig. 2) being provided in the housing for each of the frames 24. The lower frame 24 is clamped to the housing 64 by a bolt 69 and a split strap 70 (Fig. 2), which is secured by a plurality of screws 71 to a rear wall of the housing. Directly below the upper drill head 21 (Figs. 1 and 2) and extending parallel to the axis of rotation thereof is a main drive shaft 74 of the screw machine from which the driving and actuating mechanism for the various parts of the machine are driven. Keyed to rotate with the shaft 74 but slidable thereon by means of a spline connection 75 is a gear 76 having an annular channel 77 formed in the periphery of a hub portion 78 at its right end (Fig. 1). Integral with and depending from the housing 63 is a yoke 79 which is engaged in the channel 77 of the gear 76. With this construction the rotating gear 76 will move with the drill heads 21 when the latter are advanced or retracted from the bars of stock 12 mounted in the turret 10.

The gear 76 is connected to each of the drill carriers 29 by substantially similar individual friction drive mechanisms which serve to rotate the drills 22 when they are idle at a speed which is slightly less than the speed of the bars 12 and in a similar direction. The friction drive mechanism for the upper carrier as shown in Figs. 1 and 2 comprises the following mechanism: Secured to the forward end of the drill carrier 29 by a plurality of screws 81 is a driven ring 82 provided with suitable apertures through which extend the drills 22 and the pins 59 and which is also provided with an annular surface 83. Engaging the annular surface 83 is a friction ring 84 composed of fibre or other suitable material which is fixed to a surface 85 of a driven ring gear 86 provided with external teeth meshing with the gear 76 carried by the shaft 74. Secured to the ring gear 86 and projecting from an inner surface thereof are four equally spaced pins 88, two of which are illustrated in Fig. 1 and one in Fig. 5. The rear ends of the four pins 88 are engaged in notches 89 formed in the periphery of a friction ring 90 engaging a surface 91 of the driven ring 82 which is opposite to its surface 83. Secured to the rear surface of the driving ring gear 86 by a plurality of screws 92 is a pair of rings 95 carrying therebetween a plurality of equally spaced and inwardly extending leaf springs 96. The inner ends of the springs 96 engage under tension a narrow annular surface provided upon the rear surface of the friction ring 90.

During the rotation of the driving ring gear 86 it carries with it the springs 96 and through the pins 88 carried thereby engaging the notches 89 of the friction ring 90 the latter also rotates therewith and due to the tension of the springs 96 the friction ring 84 fixed to the surface 85 of the driving ring gear 86 is engaged against the surface 83 of the driven ring 82 with sufficient driving pressure to cause the latter to rotate. As hereinbefore described the ring 82 is fixed to the drill carrier 29 by the screws 81 and will therefore rotate with the ring 84 and simultaneously therewith the gear pinions 46 on the drill chucks 29 revolving with the carrier and meshing with the stationary internal ring gear 37 will also rotate about their individual axes. Due to the closeness of the axes of rotation of the drill carriers 29 and the overlapping diameters of the friction drive mechanisms therefor, as clearly shown in Fig. 2, it is necessary to arrange them in different vertical planes. By providing the gear 76 (Fig. 1) with a wide peripheral face the two offset driving ring gears 86 may mesh therewith. Referring to Fig. 6 which shows fragmentarily the friction drive mechanism for the lower carrier 29, the driving ring gear 86 is shown meshing with the gear 76 at its left end, only the driving ring gear and its cooperating parts are reversed relative to the position of the similar parts which drive the upper drill carrier, although the action of the friction drive mechanisms in both cases is the same. It is to be understood that the direction of rotation imparted to the drill carriers 29, which is clockwise as viewed in Fig. 2, by the friction drive mechanisms just described receiving its motion from the main drive shaft 74, is the same as the direction of rotation of the spindles and chucks 11 which carry the bars 12 to be drilled, but as viewed in Fig. 3, which is a view looking in a direction opposite to that of Fig. 2, the direction is shown as anti-clockwise.

Secured to the forward end of the housing 64 is a cover plate 97 which surrounds the driving ring gears 86 and extends forward therefrom, its forward wall being provided with apertures 98 into which extend collar portions 99 of the driven rings 82. Felt rings 100 are mounted in the apertures 98 and engage the periphery of the driven rings 82 for the purpose of preventing the splash and discharge of oil from the drill heads 21.

In the operation of the embodiment of this invention hereinbefore described, a plurality of bars 12 are inserted in the spindles and chucks 11 of the turret 10. The turret 10 carrying the continuously rotating chucks 11 holding the bars 12 is intermittently indexed in a clockwise direction, as viewed in Fig. 3, as indicated by the arrow between the two chucks 11, which represent the drilling stations. In timed relation with the indexing movement of the turret 10 the slide (not shown) which carries the drill heads 21, which are axially aligned with the rotating bars 12, advances towards the bars 12. The heads 21 as hereinbefore described each carry five continuously rotating drills 22, the drill carriers 29 of the heads 21 being rotated in the same direction as the bars 12, and at a speed slightly less than the speed of the bars by the friction drive mechanisms. In the advance of the drill heads 21 towards the bars 12 the five yieldingly mounted pins 59 mounted in each head 21 engage the five teeth 17 on each of the rings 14 fixed to the forward end of the chucks 11 and immediately are rotated against the flat faces 19 thereof, due to the greater speed of the chucks 11 as compared to the drill carriers. Immediately the positive rotation of the drill carriers 29 at the speed of the chucks 11 and the bars 12 carried therein is effected and without damage due to slippage occurring between the driving and driven members of the friction drive mechanisms, as will be readily apparent from the previous description.

The drilling of five apertures 101 in the bars 12 by the drills 22 proceeds to a proper depth, which is indicated in dotted outline in Fig. 1, wherein is illustrated the position of the drill heads 21 at the termination of their advance towards the turret 10. Referring to Fig. 3 it will be observed that the upper bar 12 which is the bar last advanced from the lower position has ten apertures 101 formed therein, five in axial alignment with the drills 22 and five previously drilled when the particular bar 12 was stationed at the lower position.

When the apertures 101 in bars 12 have been drilled to a predetermined depth, the drill heads 21 are automatically retracted by the slide (not shown), and during the retraction thereof the turret 10 is again indexed to position the lower bar 12 at the upper drilling position and another bar not yet drilled in the lower drilling position, whereupon the drill heads are again advanced and the drilling operation is again repeated in the manner previously described. In the retraction of the drill heads 21 the pins 59 are disengaged from the teeth 17 on the ring 14 carried by the chucks 11 and immediately the rotation of the drill heads 21 by the friction drive mechanisms is again resumed, but as before described, at a slightly decreased speed.

It will be understood that the embodiment of this invention herein described and illustrated may with appropriate changes be adapted to operate on a wide variety of piece parts other than that illustrated without departing from the spirit and scope of the appended claims.

What is claimed is:

1. In an article forming apparatus, rotary means for supporting and continuously rotating stock, a tool carrier rotatable coaxially with the stock, a tool mounted in the carrier for operating on the stock, means for relatively moving axially the carrier and the stock to position the tool in operative relation with the stock, means for rotating the carrier when in an inoperative position at a speed different than the speed of the stock support, and means associated with said carrier and operative upon a relative axial movement between the carrier and the stock, cooperating with said stock support for rotating said carrier.

2. In an article forming apparatus, rotary means for supporting and continuously rotating stock, a tool carrier rotatable coaxially with the stock, a tool mounted in the carrier for operating on the stock, means for rotating the carrier when in an inoperative position at a speed different than the speed of the stock support, means for relatively moving axially the carrier and the stock to position the tool in operative relation with the stock, and means associated with said stock support and the carrier operative during a relative axial movement between the carrier and the stock for causing the carrier to be rotated at the speed of the stock support.

3. In an article forming apparatus, rotary means for supporting and rotating stock, a tool carrier rotatable coaxially with the stock, a tool mounted in the carrier for operating on the stock, means for advancing axially the carrier to move the tool into operative relation with the stock, means for rotating the carrier when in an inoperative position at a speed different than the speed of the stock support, and means associated with said stock support and the carrier coacting during the advance of the latter for effecting the operation of the means for rotating the carrier for causing the latter to be rotated from the stock support and at the speed thereof.

4. In an article forming apparatus, rotary means for supporting and rotating stock, a tool carrier rotatable coaxially with the stock, a tool mounted in the carrier for operating on the stock, means for advancing axially the carrier to move the tool into operative relation with the stock, driving means for rotating the carrier when in an inoperative position at a speed different than the speed of the stock, said driving means including a friction drive mechanism, and means associated with said stock support and the carrier operatively engaged during the advance of the latter for rotating the same from the stock support and at the speed thereof.

5. In an article forming apparatus, rotary means for supporting and rotating stock, a tool carrier rotatable coaxially with the stock, a tool mounted in the carrier for operating on the stock, means for advancing axially the carrier to move the tool into operative relation with the stock, means for rotating the carrier when in an inoperative position at a speed different than the speed of the stock, a serrated surface on the stock support, and a yieldable member on the carrier for engaging the serrated surface on the stock support during the advance of the carrier for effecting the operation of the means for rotating the carrier for causing the latter to be rotated from the stock support and at the speed thereof.

6. In an article forming apparatus, rotary means for supporting and rotating stock, a tool carrier rotatable coaxially with the stock, a tool mounted in the carrier for operating on the stock, means for advancing axially the carrier to move the tool into operative relation with the stock, driving means for rotating the carrier when in an inoperative position at a speed different than the speed of the stock and in a similar direction, said driving means including a friction drive mechanism, and means carried by the stock support and the carrier coacting during the advance of the latter for causing the rotation of the carrier from the stock support and at the speed thereof.

7. In an article forming apparatus, rotary means for supporting and continuously rotating stock, a tool carrier rotatable coaxially with the stock, a tool mounted in the carrier for operating on the stock at a point removed from its axis of rotation, means for rotating the carrier when in an inoperative position at a speed different than the speed of the stock support, means for relatively moving axially the carrier and the stock to position the tool in operative relation with the stock, and means associated with said stock support and the carrier operative during a relative axial movement between the carrier and the stock for causing the tool carrier to be rotated at the speed of the stock support.

8. In an article forming apparatus, rotary means for supporting and rotating stock, a tool carrier rotatable coaxially with the stock, a rotary tool mounted in the carrier for operating on the stock, at a point removed from its axis of rotation, means associated with the carrier and operatively connected with the tool for causing the rotation of the tool about its own axis when the carrier is rotating, means for rotating the carrier when in an inoperative position at a speed different than the speed of the stock support, means for relatively moving axially the carrier and the stock to position the tool in operative relation with the stock, and means associated with said stock support and the carrier operative upon a relative axial movement between the carrier and the stock for causing the carrier to be rotated at the speed of the stock support.

9. In an automatic screw machine of the type wherein a plurality of individually rotatable stock supporting and rotating spindles are revolved about a common central axis to index them successively with respect to a fixed station, a tool carrier positioned at the station rotatable coaxially with the stock, a tool mounted in the carrier for operating on the stock, means for rotating the carrier when in an inoperative position at a speed different than the speed of the stock, means for advancing axially the carrier to move the tool into operative relation with the stock, and means associated with said stock spindles and the carrier operative during the advance of the latter for causing the carrier to be rotated at the speed of the stock spindle.

10. In an automatic screw machine of the type wherein a plurality of individually rotatable stock supporting and rotating spindles are revolved about a common central axis to index them successively with respect to a fixed station, a drill carrier positioned at the station rotatable coaxially with the stock, a drill mounted in the carrier for operating on the stock at a point removed from its axis of rotation, means associated with the carrier and operatively connected with the drill for causing the rotation of the drill about its own axis when the carrier is rotating, driving means for rotating the carrier when in an inoperative position at a speed different than the speed of the stock and in a similar direction, said driving means including a friction drive mechanism, means for advancing the carrier to move the drill into operative relation with the stock, and means associated with said stock spindles and the carrier operative during the advance of the latter for causing the carrier to be rotated at the speed of the stock spindle.

11. In an article forming apparatus, rotary means for supporting and continuously rotating stock, a rotatable tool carrier longitudinally aligned with the stock, a tool mounted in the carrier for operating on the stock, means for simultaneously rotating and advancing the carrier to cause rotation of the tool and a movement thereof into operative relation with the stock, and means associated with said stock support and the carrier operative upon the tool being moved into operative relation with the stock for causing the carrier to be rotated directly from the stock support.

12. In an article forming apparatus, rotary means for supporting and continuously rotating stock, a reciprocable hollow frame, an internal gear fixed therein, a tool carrier longitudinally aligned with the stock and rotatably journaled in the frame, a plurality of rotatable tool holding spindles journaled in the carrier, a pinion carried by each of said spindles and meshing with said internal gear for causing a rotation of the spindles when the carrier is rotated, a tool carried by each of said spindles for operating on the stock, means for moving the frame to axially advance the carrier and thereby move the tools into operative relation with the stock, means for rotating the carrier when in an inoperative position at a speed different than the speed of the stock support, and means associated with said stock support and the carrier coacting during the advance of the latter for causing the latter to be rotated from and at the same speed as the stock support.

In witness whereof, I hereunto subscribe my name this 22nd day of March, A. D. 1930.

JOHN S. STULL.